United States Patent

[11] 3,586,376

| [72] | Inventor | Noel Le Mire<br>Billancourt, France |
|---|---|---|
| [21] | Appl. No. | 813,103 |
| [22] | Filed | Apr. 3, 1969 |
| [45] | Patented | June 22, 1971 |
| [73] | Assignees | Regie Nationale Des Usines Renault<br>Billancourt, France;<br>Automobiles Peugeot<br>Paris (Seine), France |
| [32] | Priority | Apr. 4, 1968 |
| [33] | | France |
| [31] | | 147018 |

[54] SAFETY SEAT OF VEHICLES
1 Claim, 3 Drawing Figs.

[52] U.S. Cl. .................................................. 297/452,
297/216
[51] Int. Cl. ................................................... A47c 7/02,
B60r 21/00, B60n 1/02

[50] Field of Search ........................................... 297/216,
302, 452, 454—460

[56] References Cited
UNITED STATES PATENTS
3,437,367  4/1969  Blank ........................ 297/216 X
3,501,200  3/1970  Ohta .......................... 297/216 X

*Primary Examiner*—Casmir A. Nunberg
*Attorney*—Stevens, Davis, Miller & Mosher

ABSTRACT: A vehicle seat having an impact-absorbing back formed by upright members interconnected by a transverse bar. The upright members are formed in sections assembled on sleeves and held by retaining means in a normal position. The back will deform upon application of a force thereto by the sections sliding into the sleeves when the force overcomes the retaining means.

PATENTED JUN22 1971 3,586,376
Fig-1
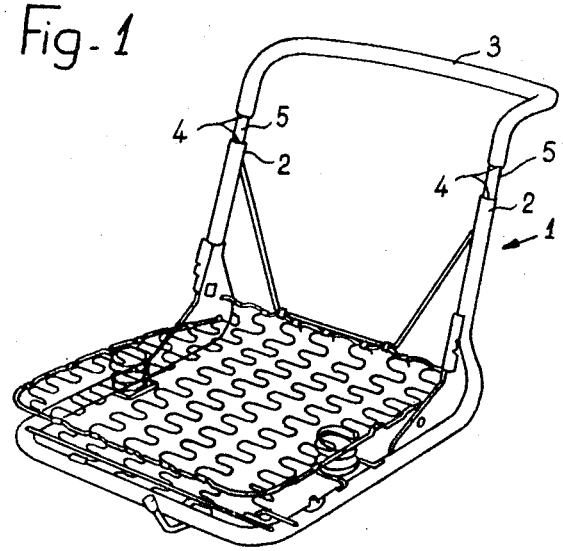
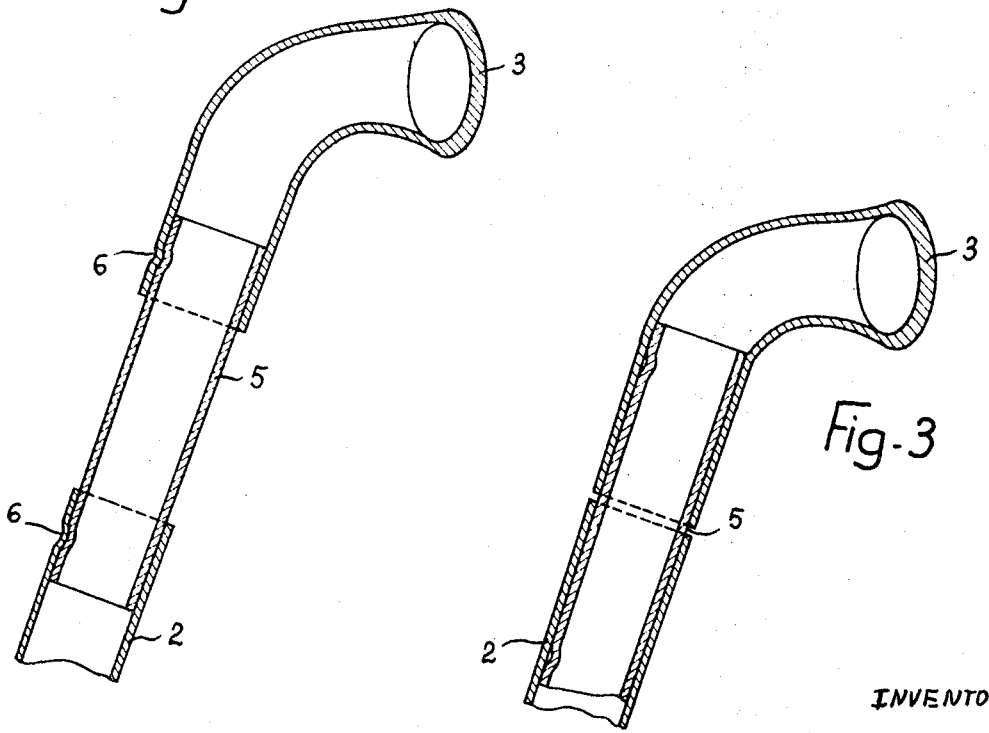
Fig-2
Fig-3
INVENTOR
NOËL LE MIRE
By Stevens, Davis, Miller & Mosher
ATTORNEYS

SAFETY SEAT OF VEHICLES

The present invention relates to vehicle seats in general and has specific reference to a safety seat and more particularly to the back portion thereof which is intended for absorbing the kinetic energy developed in case of shock by a person placed behind this seat and striking with force the upper portion of the back, for example in case of crash.

This seat is characterized by the fact that the frame structure of its back comprises at least one deformable portion adapted to yield gradually and in proportion to the kinetic energy to be absorbed or dissipated.

According to a specific form of embodiment of the seat constituting the subject matter of this invention, the back frame structure comprises uprights divided into sections, and a deformable element adapted to absorb the mechanical energy which is disposed between the pairs of adjacent sections of said uprights.

Other features and advantages of this invention will appear as the following description proceeds with reference to the attached drawing illustrating diagrammatically by way of example a typical form of embodiment of a seat back armature or frame structure according to this invention. In the drawing:

FIG. 1 is a perspective view of the frame structure of a seat;

FIG. 2 is a diagrammatic fragmentary vertical section showing the manner in which the component elements of an upright are assembled; and FIG. 3 is a view similar to FIG. 2 but showing the upper portion of the back after it has collapsed or yielded.

The tubular frame structure of the back 1 illustrated in the drawing comprises a pair of uprights 2 interconnected by an upper transverse bar 3 and sectioned at 4 in the vicinity of this bar. A tubular member 5 interconnects the resulting sections of a same upright. These tubular members 5 are normally retained in position by being force fitted therein and punched at suitable locations such as 6 providing detent means for retaining the tubular member 5 in its normal position.

Of course, the seat back is covered with conventional padding and upholstering elements (not shown).

Thus, when a shock attaining a certain force is exerted against the upper portion of the back structure, the uprights 2 thereof will collapse along an axial distance substantially proportional to the stress thus generated by force sliding on the tubular member 5.

Of course, the above-described arrangement is also applicable to seats having a back frame structure comprising more than two uprights 2.

I claim:

1. A vehicle seat comprising a deformable back frame structure having upright members interconnected by a transverse bar, characterized in that said upright members are sectioned and the sections of each upright member are assembled on a sleeve member having retaining means to retain said sleeve member in a prescribed position relative to the coacting sections, said uprights being adapted to collapse as a result of forced sliding of said sleeve member in said sections thereby causing said sections to move towards each other.